United States Patent [19]

Werdich

[11] Patent Number: 4,966,386
[45] Date of Patent: Oct. 30, 1990

[54] TORSION SPRING BAR AXLE FOR VEHICLE TRAILERS

[75] Inventor: Anton Werdich, Bibertal, Fed. Rep. of Germany

[73] Assignee: Alois Kober KG, Kötz, Fed. Rep. of Germany

[21] Appl. No.: 302,746
[22] PCT Filed: Jun. 1, 1987
[86] PCT No.: PCT/EP87/00358
§ 371 Date: Mar. 8, 1989
§ 102(e) Date: Mar. 8, 1989
[87] PCT Pub. No.: WO88/00534
PCT Pub. Date: Jan. 28, 1988

[30] Foreign Application Priority Data

Jul. 18, 1986 [DE] Fed. Rep. of Germany ... 8619274[U]

[51] Int. Cl.⁵ .............................................. B60G 3/00
[52] U.S. Cl. ................................. 280/700; 280/717; 267/276; 267/281
[58] Field of Search ............... 280/717, 713, 700, 688, 280/690, 697; 267/276, 273, 281

[56] References Cited

U.S. PATENT DOCUMENTS

| | | | |
|---|---|---|---|
| 2,409,501 | 10/1946 | Krotz | 280/717 |
| 2,577,761 | 12/1951 | Hickman | 280/717 |
| 2,606,020 | 8/1952 | Anderson | 267/273 |
| 2,702,701 | 2/1955 | Thorne et al. | 267/273 |
| 3,687,479 | 8/1972 | Kober | 280/717 |
| 4,723,790 | 2/1988 | Wharton | 280/700 |

FOREIGN PATENT DOCUMENTS

| | | | |
|---|---|---|---|
| 1889713 | 3/1964 | Fed. Rep. of Germany . | |
| 2014191 | 3/1970 | Fed. Rep. of Germany . | |
| 7432566 | 4/1975 | Fed. Rep. of Germany . | |
| 2621787 | 12/1977 | Fed. Rep. of Germany | 267/281 |
| 1187273 | 9/1959 | France . | |
| 2123291 | 9/1972 | France . | |
| 2442728 | 6/1980 | France . | |
| 815608 | 7/1959 | United Kingdom | 280/717 |

Primary Examiner—Charles A. Marmor
Assistant Examiner—Tamara L. Finlay
Attorney, Agent, or Firm—McGlew & Tuttle

[57] ABSTRACT

The invention provides a torsion spring bar axle which combines a rubber spring axle with a steel torsion rod for an unexpected result. The axle comprises an axle tube which houses a hollow torsion rod between which are placed rubber bodies creating a rubber spring axle inside the hollow torsion rod there is also a steel torsion which is internally biased. The steel torsion rod is adjustably connected to the axle tube on one end and a wheel swing lever on the other end. The hollow torsion rod is also connected to the wheel swing lever. This allows for less spring action with increasing loads and a soft deflection of the wheel swing lever.

18 Claims, 6 Drawing Sheets

TORSION SPRING BAR AXLE FOR VEHICLE TRAILERS

FIELD OF THE INVENTION

The invention relates to a torsion spring bar axle for vehicle-trailers, especially for recreation vehicles and the like. Herein, each wheel swing lever is mounted to a hollow torsion rod, which is supported in the peripheral direction in a hollow and prismatic carrier tube by means of strand-shaped rubber bodies. The hollow and prismatic carrier tube is fixedly connected to the trailer frame and the hollow torsion rod protrudes without contact by a steel torsion rod, which is connected non-rotatably to the wheel swing lever on one side and to the carrier tube on the other side.

BACKGROUND OF THE INVENTION

Such a torsion spring bar axle is known through French Pat. No. 2 123 291. There the torsion rod and the carrier tube have a square cross-section, the side of the strand-shaped rubber bodies facing inside being adjacent to the plane outer wall of the torsion rod and the side facing outside being adjacent to the bevelled inner edge of the carrier tube. It is known from practice that such torsion spring axles do not have substantial dampening characteristics, as the rubber bodies are merely subject to compression or squeezing deformation.

The steel torsion rod protruding through the hollow torsion rod connects the wheel swing levers to one another and is supported rotationally rigid in the central section by a wall interspersing the carrier tube.

In cooperation the rubber bodies and the steel torsion rod of the rubber spring axle result in a lightly steeper spring characteristic with higher load resistance, but it acts practically without dampening.

SUMMARY OF THE INVENTION

The invention is based on the task of developing a torsion spring bar axle improved with regard to the prior art, which requires a much smaller spring range of the wheel swing lever, which has good dampening characteristics and which can be mounted and adjusted easily.

The solution of this task according to the invention is that the rubber bodies are led between concave indentations of the torsion rod and fitting angle areas of the carrier tube facing the indentations and that a steel torsion rod is axially secured in the hub of the assigned wheel swing lever and that it is also mounted rotationally rigid in a hub, which engages by means of a toothed flange with a likewise toothed flange being an integral part of the carrier tube. The two flanges can be screwed together in a twisted position with regard to one another.

In such an arrangement according to the invention the deflection of the single wheel swing lever is branched. One branch works by means of the rubber bodies on the rigid axle tube and leads to the dampening of the spring action. The other branch works by means of the built-in steel torsion rod on the rigid axle tube, too, but without any dampening action. The result is a high deflection output with a dampening effect at a small spring action. Therefore the spring suspension in highly loaded vehicle trailers can be dampened.

French Pat. No. 2 442 728 does disclose a rubber spring axle with a hexagonal carrier tube and a triangular torsion rod, whose walls are indented concavely. However, the steel rod is not used as a steel torsion rod, but as a stabilization element for both the wheel swing levers. The known rubber spring axle features a soft spring action of the wheel swing lever during the whole load range and dampening in the spring action.

The cross section of the strand-shaped rubber bodies and the rigidity of the rubber material can influence the spring characteristics of the known torsion spring axles to some extent. This possibility is no longer given, however, when the design of the vehicles does not allow for an arbitrarily sized design of the rubber spring axle, and especially if the spring range of the wheel swing lever is limited.

Within the framework of one embodiment according to the invention the steel torsion rod is built with a pre-tension of, e.g. 5° and comprises several layers of spring steel bands with a rectangular cross section, which together form a preferably square cross section. The invention does allow for the formation of other cross sections of the steel torsion rod. This, however, would not be suggested since the hollow torsion rod's interior is limited by its symmetrically indented walls. Therefore, a square cross section of the steel torsion rod would be ideal.

In another embodiment of the invention the steel torsion rod sits in matching hollow prismatic receivers in the hub of the axle tube and the hub of the wheel swing lever where it is secured against axial relative movements. Therefore the arrangement of the steel torsion rod and its connection to the single hub leads to an axial fixation of the hollow torsion rod, which does therefore not have to be secured against proper axial motion by any of the known means.

It is advisable to use a threaded bolt with a key-formed face side which protrudes with its point into a matching boring of the steel torsion rod and which is countered with a nut outside the hub as an axial safety means.

The bias desired according to the invention can be achieved without major efforts, by the flanges between the axle tube and the hub connectable to it being equipped with interengaging toothings, for the formation of a locking flange connection. Therefore, when the torsion spring bar axle is mounted, the flange connection between the hub and the axle tube is closed only once the desired bias of the steel torsion rod has been achieved. Once the bias is set, due to the interengaging toothings the chosen bias will not change.

Finally, the embodiment according to the invention has two U-shaped shackles provided for the fastening of the axle tube to the trailer-frame, the shackles having openings for the passage of the axle tube therethrough. The rigidity of the shackle legs can be is increased by at least one welded-on intermediate link on the inside of the shackle hoop web connecting the shackle legs. Such an arrangement allows for various options with regard to the fixing of the axle tube, e.g. through web or through the legs of the U-shaped shackle.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE PREFERRED EMBODIMENTS

Figure 1:
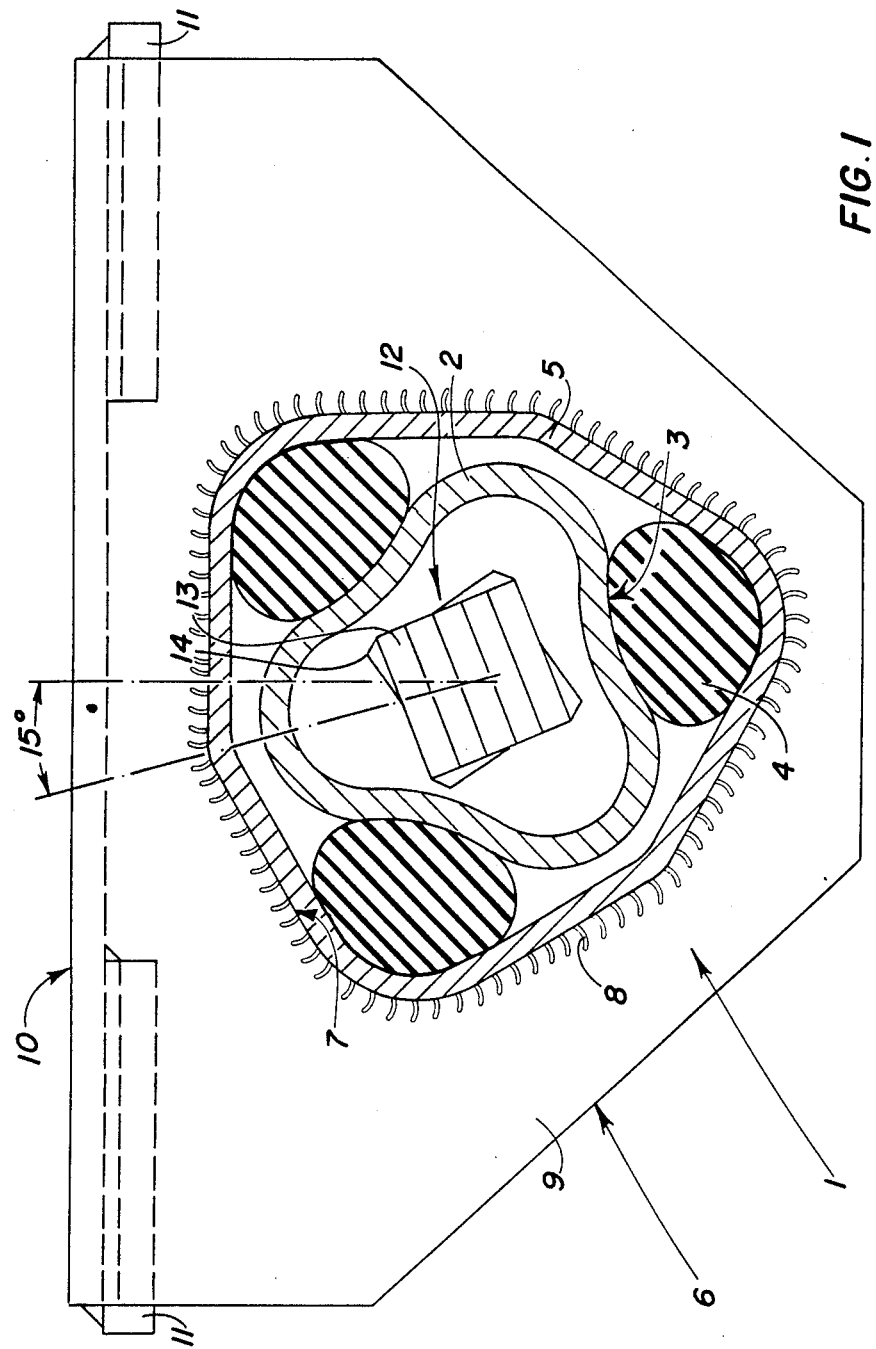
FIG. 1 is a cross sectional view of a torsion spring bar axle, according to the invention.
Figure 2:
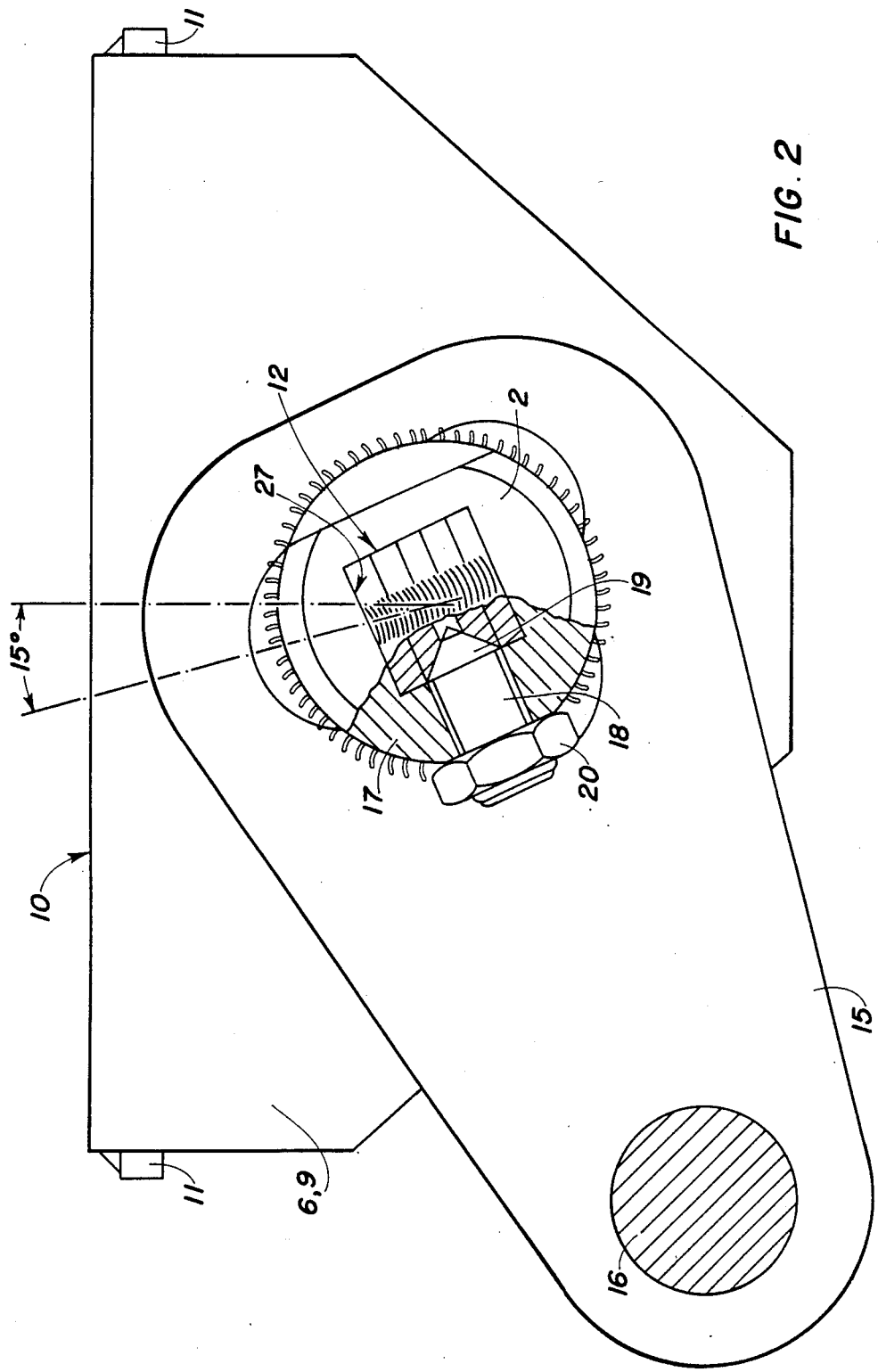
FIG. 2 is a plan view of a wheel swing lever mounted on one end of the torsion spring bar axle according to FIG. 1.

In the embodiment of FIG. 1 the principle of the torsion spring bar axle 1 according to the invention is shown in cross section. A hollow torsion rod 2 with several indentations 3 of its wall is lined on the outside with strand shaped rubber bodies 4, which are supported in an axle tube 5, with a respective diameter, fixed on the trailer frame. A single wheel swing lever 15 is fastened to the hollow torsion rod 2 (FIG. 2). Therefore the spring deflection action of the wheel swing lever 15, and therefore of the hollow torsion rod 2, leads to a flexing movement of the strand shaped rubber bodies 4 and therefore to a dampened spring action with regard to the rigid axle tube 5.

The axle tube 5 is fastened to the trailer frame by means of one or several U-shaped shackles 6. Each single leg of the shackle 9 has an inner opening 7 for the reception of the axle tube 5, which is connected to the shackle opening 7 by means of a welded seam 8.

Figure 3:
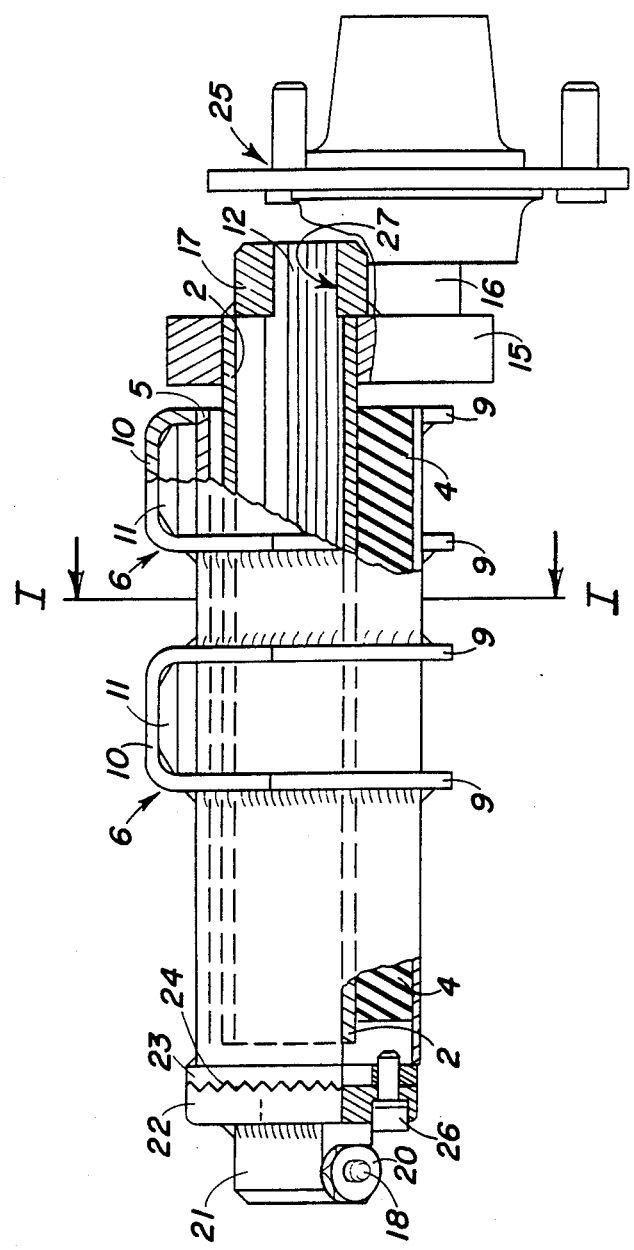
FIG. 3 is a side elevational view of the torsion spring bar axle according to FIG. 1 and 2 and FIG. 4 to 6 are diagrams for torsion spring bar axles of various constitution with regard to the proportion of wheel load to spring range.

As shown in FIG. 3, the shackle 6 is U-shaped and has two parallel shackle legs 9, which are connected by means of a shackle web 10. In order to increase the rigidity of these shackle legs 9, intermediate links 11 can be welded to the shackle legs 9 and the shackle web 10.

A steel torsion rod 12 runs through the hollow torsion rod 2. In the example given the steel torsion rod 12 consists of several layers of steel spring bands 13, which are connected.

The face ends of this steel torsion rod 12 are connected with the axle tube 5 on one end and with the wheel swing lever 15 on the other end, as shown in FIG. 3.

FIG. 1 also shows that the steel torsion rod 12 has a spring-bias 14, which has no influence on the tension condition between the hollow torsion rod 2 and the axle tube 5. Therefore, while the rubber spring axle formed by the strand shaped rubber body 4 is still relatively un-influenced, the steel torsion rod 12 has an internal bias.

The embodiment in FIG. 2 shows how the wheel swing lever 15 can be connected with the steel torsion rod 12. In this context it has to be said that the same construction can be chosen for use between the hub 21 of the axle tube 5 (FIG. 3) and the steel torsion rod 12.

In FIG. 2 the hub 17 of the wheel swing lever 15 is penetrated by a threaded bolt 18 which engages by a conical point 19 in a matching boring of the steel torsion rod 12. A counter nut 20 for the fixed arrangement of the threaded bolt 18 is tightened on the outside of the hub 17. This fixed arrangement can receive additional support by the use of glue.

Herein the steel torsion rod 12 is slid into a corresponding receptacle with a hollow prismatic profile 27 in the hub 17 of the wheel swing lever 15.

From the side view of the torsion spring bar axle 1 according to the invention as shown in FIG. 3 it can be seen that the hub 21 on the axle tube-side is connected fixedly and torsion-proof to the axle tube 5 by means of a flange joint screw 26. In order to guarantee the torsional rigidity in the peripheral direction, the flanges 22, 23 can have radial toothings 24. This arrangement can induce and fix the bias of the steel torsion rod 12 in the desired manner. For this purpose the flange joint screw 26 is loosened and the hub 21 of the axle tube 5 is rotated to the desired bias angle, then the flange connection 22, 23, 26 is effected.

On the other side the connection between the steel torsion rod 12 and the hub 17 of the wheel swing lever 15 can be effected in the same manner. The wheel hub 16 of the wheel swing lever 15 receives the wheel carrier 25 in the usual manner.

Figure 4:
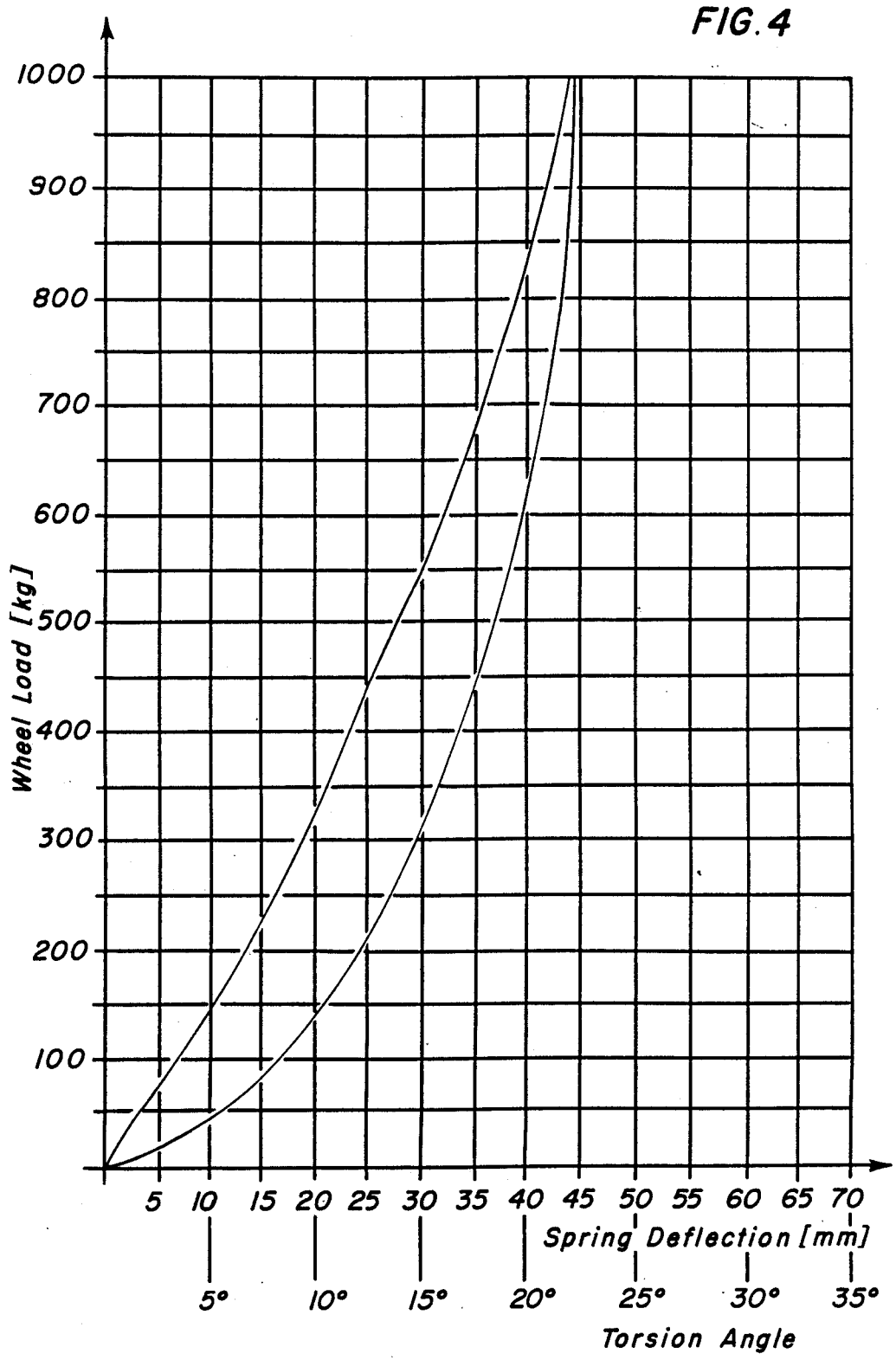
Figure 5:
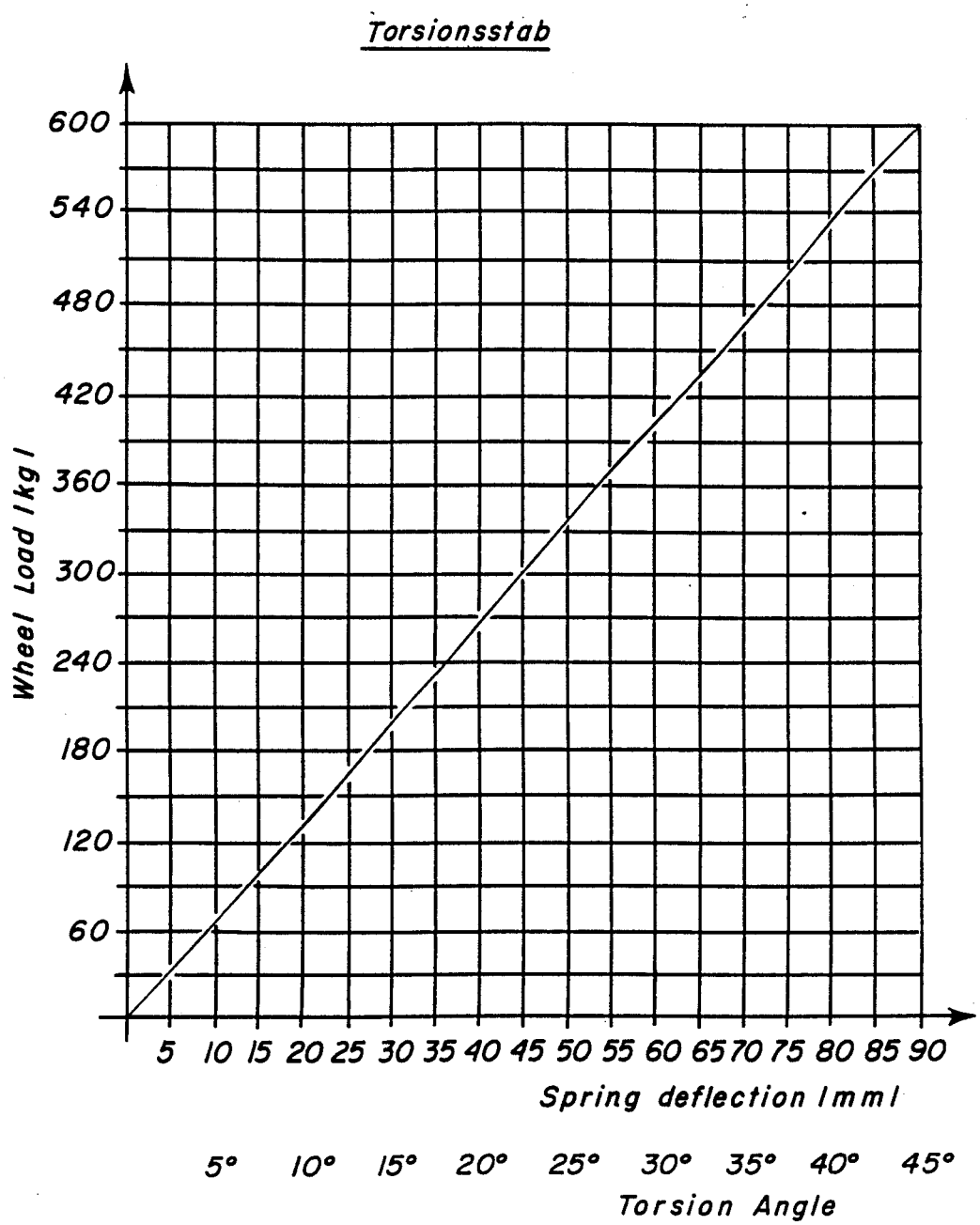
Figure 6:
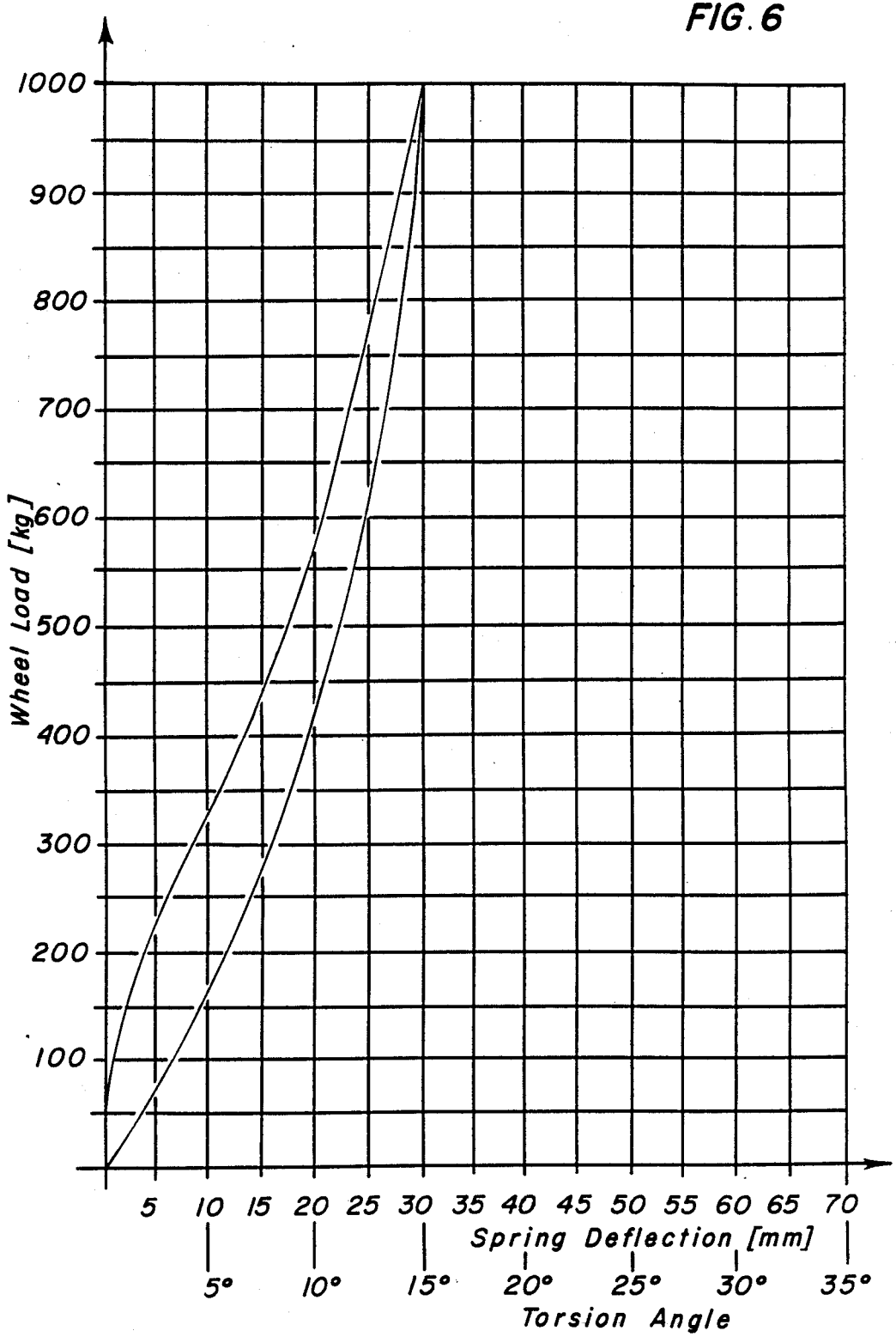

The diagrams in FIG. 4 to 6 show the essential difference in spring action of various axles. FIG. 4 represents the spring action of a customary rubber spring axle. The dampening of the spring can be easily recognized in the hysteresis curve. It can be seen that at a wheel load of e.g 1000 kg a spring range of 45 mm, resp. a torsional angle of 22.5° is used.

The characteristic of a plain steel torsion rod according to FIG. 5 is different. A comparison to FIG. 4 shows that the steel torsion rod causes a spring action of 90 mm, resp. a torsional angle of 45° already at a load of 600 kg.

The combination of the known rubber spring axle with the known steel torsion rod is represented in FIG. 6 and shows a surprising result which wa not to be expected.

In FIG. 6 it is shown that the torsion spring bar axle according to the invention also shows dampening, even if it is not as strong as the known rubber spring axle in FIG. 4. A comparison of the FIG. 4 and 6 shows, however, that the torsion spring bar axle according to the invention takes up a load of 350 kg in a torsional angle of 5°. For the known rubber spring axle according to FIG. 4 the same angle is achieved with a wheel load of only 150 kg. In the diagrams of the FIG. 4 to 6 the same wheel load is assumed.

The torsion spring bar axle according to the invention therefore has a very small spring action in the bottom range of increasing loads. In the top range of the load the spring action of the torsion spring bar axle according to the invention is considerably smaller than in conventional axles.

While specific embodiments of the invention have been shown and described in detail to illustrate the application of the principles of the invention, it will be understood that the invention may be embodied otherwise without departing from such principles.

I claim:

1. Torsion spring bar axle of vehicle trailers, comprising a single wheel swing lever mounted on a hollow torsion rod, said hollow torsion rod being supported in peripheral direction in a hollow and prismatic axle tube by means of strand shaped rubber bodies, the hollow and prismatic axle tube being fixedly connected to the trailer frame and the hollow torsion rod extends from the axle tube without contact by a steel torsion rod, said steel torsion rod being connected rotationally rigid to the wheel swing lever on one side and connected to the axle tube on the other side, each of said rubber bodies being positioned between concave indentations formed in the the hollow torsion rod, and positioned between facing, fitting edge areas formed in the axle tube, said steel torsion rod being axially secured at one end in a first hub of the associated wheel swing lever, and at another end mounted rotationally rigid in a second hub which comprises a first toothed flange, second toothed flange being an integral part of the axle tube each of the toothed flanges being connectable by screws in a twisted position with regard to one another.

2. Axle according to claim 1, wherein the steel torsion rod is biased 5°.

3. Axle according to claim 1, wherein the steel torsion rod consists of several layers of spring steel bands with rectangular cross sections, which together form a square cross section.

4. Axle according to claim 3, wherein the steel torsion rod is secured to the second hub by a threaded bolt with a conical face, whose point protrudes into a matching boring in the steel torsion rod and said threaded bolt is countered with a nut at an exterior of the second hub.

5. Axle according to claim 1, wherein two U-shaped shackles are provided for the fixed connection of the axle tube to the trailer frame, each said U-shaped shackle having an opening in each of two legs, the opening of each shackle leg for the passage of the axle tube, the shackle legs connected by a shackle web, the shackle web reinforced by at least one welded intermediate link welded on an inside of the shackle web.

6. A torsion spring bar axle comprising: a wheel swing lever; an internally biased torsion rod; a plurality of rubber bodies; a hollow torsion rod having an outer surface for receiving said rubber bodies so they extend in an axial direction, the hollow torsion rod housing the internally biased torsion rod, said hollow torsion rod being connected to the swing lever; an axle tube with mid and end sections surrounding the axially extending rubber bodies, the hollow torsion rod and the internally biased torsion rod, and ending in an axle tube hub on one end and fixedly connected at the mid-section and at another end to U-shaped shackles, the U-shaped shackles having legs with openings for receiving the axle tube for fixation to a trailer body; a swing lever hub positioned in the wheel swing lever, the wheel swing lever hub having a hollow opening for receiving the internally biased torsion rod, steel torsion rod connection means for connecting the internally biased torsion rod to said axle tube hub, said internal biasing being adjustable by said connection means, a wheel hub positioned in the wheel swing lever to receive a wheel carrier.

7. A torsion spring bar axle as claimed in claim 6, wherein the U-shaped shackles can be reinforced by the addition of intermediate links placed on a shackle web located between the shackle legs.

8. A torsion spring bar axle as claimed in claim 6, wherein the steel torsion rod may be comprised of several layers of steel bands which, when placed together, form a square cross-section.

9. A torsion spring bar axle as claimed in claim 6, wherein the bias of the steel torsion rod is 5°.

10. A torsion spring bar axle according to claim 6, wherein: said connection means includes a flange connected to the axle tube with a first engaging portion and a second engaging portion connected to said internally biased torsion rod, said engaging portions being tightenable into engagement by a fixing member and being movably adjustable upon disengagement of said fixing member to adjust the internal bias of said torsion rod.

11. A torsion spring bar axle comprising: a swing lever having a first connection and a second connection spaced from said first connection, said second connection engaging with a wheel hub portion; a torsion rod having a first end and a second end, said torsion rod first end fixedly connected with said swing lever first connection; an axle tube hub connected to said torsion rod second end; a hollow torsion rod fixedly connected to said swing lever and extending about said torsion rod from said torsion rod first end towards said torsion rod second end; axially extending rubber bodies positioned about said hollow torsion rod; an axle tube surrounding said axially extending rubber bodies and said hollow torsion rod, said axially extending rubber bodies cooperating with said hollow torsion rod and said axle tube to define a spacing between said hollow torsion rod and said axle tube; and, connection means for adjustably connecting said axle tube hub to said axle tube to adjust the torsional setting of said torsion rod with respect to said axle tube.

12. Torsion spring bar axle of vehicle trailers, caravans and the like, comprising: a single wheel swing lever mounted on a hollow torsion bar having indented walls; rubber bodies positioned in said indented walls, the hollow torsion bar being elastically supported in the peripheral direction through the rubber bodies being in connection with an axle tube which is fixedly connected to the trailer frame, a steel torsion rod positioned through the hollow torsion bar free of contact, the steel torsion rod being connected on one end with the wheel swing lever and on the other end with a hub, said hub adjustably connected to the axle tube, wherein said steel torsion rod being adjustable in peripheral direction, the steel torsion rod being mounted with an internal bias.

13. Axle according to claim 12, wherein the bias of the steel torsion rod is 5°.

14. Axle according to claim 12, wherein the steel torsion rod consists of several layers of spring steel bands with rectangular cross sections, which together form a square cross section.

15. Axle according to claim 12, wherein the steel torsion rod fits into a hollow prismatic receptacle in the hub and is secured against relative axial motion.

16. Axle according to claim 15, wherein the connection of the steel torsion rod to the hub is secured by means of a threaded bolt with a conical face, whose point protrudes into a matching boring in the steel torsion rod and which is countered with a nut at an exterior of the hub.

17. Axle according to claim 12, wherein there is a first flange with toothings arranged on the axle tube and a second flange with toothings arranged on the hub, the toothings of the first and second flange interengage thereby forming the adjustable connection.

18. Axle according to claim 12, wherein there are two U-shaped shackles comprising legs and a connecting shackle web are provided for the fastening of the axle tube to a the trailer frame, the shackles having openings for the passage of the axle tube and the shackles being strengthened by fastening at least one intermediate link on an inside of the shackle web connecting the legs together.

* * * * *

UNITED STATES PATENT AND TRADEMARK OFFICE
CERTIFICATE OF CORRECTION

PATENT NO. : 4,966,386

DATED : October 30, 1990

INVENTOR(S) : Anton Werdich

It is certified that error appears in the above-identified patent and that said Letters Patent is hereby corrected as shown below:

ON THE TITLE PAGE:

Please change the PCT filing date from Jun., 1, 1987 to Jul., 1, 1987.

Signed and Sealed this

Fourteenth Day of July, 1992

Attest:

DOUGLAS B. COMER

*Attesting Officer*     Acting Commissioner of Patents and Trademarks